(12) United States Patent
Chen et al.

(10) Patent No.: US 11,278,083 B2
(45) Date of Patent: Mar. 22, 2022

(54) MIDSOLE MATERIAL COMPOSITION, METHOD FOR PRODUCING MIDSOLE MATERIAL AND SHOE SOLE

(71) Applicant: NATIONAL CHENG KUNG UNIVERSITY, Tainan (TW)

(72) Inventors: Chuh-Yung Chen, Tainan (TW); Cheng-Chien Wang, Tainan (TW); Cheng-Wei Huang, Tainan (TW); Meng-Heng Wu, Tainan (TW); Chao-Yu Lai, Tainan (TW); Yu-Ning Shu, Tainan (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 70 days.

(21) Appl. No.: 16/200,615

(22) Filed: Nov. 26, 2018

(65) Prior Publication Data

US 2019/0246739 A1 Aug. 15, 2019

Related U.S. Application Data

(60) Provisional application No. 62/629,711, filed on Feb. 13, 2018.

(30) Foreign Application Priority Data

Aug. 24, 2018 (WO) ................ PCT/CN2018/102178

(51) Int. Cl.
| | | |
|---|---|---|
| *C09J 5/06* | (2006.01) | |
| *A43B 13/12* | (2006.01) | |
| *A43B 13/32* | (2006.01) | |
| *C09J 7/35* | (2018.01) | |
| *C09J 7/10* | (2018.01) | |
| *B32B 37/12* | (2006.01) | |
| *C09J 4/06* | (2006.01) | |
| *C09J 11/08* | (2006.01) | |
| *A43B 1/00* | (2006.01) | |
| *A43B 13/04* | (2006.01) | |
| *B29D 35/12* | (2010.01) | |
| *B29K 101/12* | (2006.01) | |

(52) U.S. Cl.
CPC ............ *A43B 13/32* (2013.01); *A43B 1/0063* (2013.01); *A43B 13/04* (2013.01); *A43B 13/125* (2013.01); *B29D 35/122* (2013.01); *B32B 37/1207* (2013.01); *C09J 4/06* (2013.01); *C09J 5/06* (2013.01); *C09J 7/10* (2018.01); *C09J 7/35* (2018.01); *C09J 11/08* (2013.01); *B29K 2101/12* (2013.01); *B32B 2037/1215* (2013.01); *B32B 2437/02* (2013.01); *C09J 2301/408* (2020.08); *C09J 2301/414* (2020.08); *C09J 2301/416* (2020.08); *C09J 2423/04* (2013.01); *C09J 2423/108* (2013.01); *C09J 2475/00* (2013.01); *C09J 2493/00* (2013.01)

(58) Field of Classification Search
CPC ..... A43B 1/0063; A43B 13/04; A43B 13/125; A43B 13/32; A43D 25/20; B29D 35/122; B32B 37/1207; B32B 2037/1215; B32B 2437/02; B32B 37/10; B32B 2037/1223; C08J 9/0042; C08J 9/0061; C08J 9/122; C08J 2323/06; C08J 2323/08; C08J 2423/06; C08J 2423/08; C09J 11/08; C09J 4/06; C09J 5/06; C09J 7/10; C09J 7/35; C09J 2201/61; C09J 2205/102; C09J 2205/114; C09J 2205/31; C09J 2421/00; C09J 2423/04; C09J 2423/108; C09J 2431/00; C09J 2475/00; C09J 2493/00; C09J 2301/408; C09J 2301/414; C09J 2301/416; C09J 2301/304; C09J 123/0853; C09J 11/04; B29K 2101/12; C08K 3/04; C08K 3/14; C08K 3/22; C08K 3/346; Y02P 70/62; C08L 2205/025; C08L 2205/03; C08L 2205/035
See application file for complete search history.

(56) References Cited

U.S. PATENT DOCUMENTS

2012/0322905 A1* 12/2012 Kusanose .............. C08J 9/0066
521/139

FOREIGN PATENT DOCUMENTS

| CN | 102690463 A | 9/2012 |
|---|---|---|
| CN | 106117765 A | 11/2016 |
| TW | 201006849 A | 2/2010 |
| TW | 201739819 A | 11/2017 |

OTHER PUBLICATIONS

Ambra, Masterbatches Applications and Solutions, https://www.ambrapolymers.com/en/applications_and_solutions/masterbatches.html (first published in 2013) (Year: 2018).*
Tolinski, Science Direct Masterbatch Processing Aids for Extrusion, Additives for Polyolefins (Second Edition) (Year: 2015).*

* cited by examiner

*Primary Examiner* — Irina S Zemel
(74) *Attorney, Agent, or Firm* — CKC & Partners Co., LLC (57) ABSTRACT

The present invention relates to a midsole material composition, a method for producing the midsole material and a shoe sole. The midsole material composition comprises an elastomer, a thermoplastic polymer, a suitable crosslinker and a catalyst, such that the midsole material of the present invention can be fabricated by subjecting the midsole material composition to a phase-inversion crosslinking reaction and a foaming process. The aforementioned thermoplastic polymer, which is a recyclable material, is inverted into a continuous phase after the phase-inversion crosslinking reaction, thereby enhancing a recycling property of the midsole material and improving a reusability of the shoe sole.

13 Claims, 6 Drawing Sheets

MIDSOLE MATERIAL COMPOSITION, METHOD FOR PRODUCING MIDSOLE MATERIAL AND SHOE SOLE

RELATED APPLICATIONS

This application claims priority to U.S. provisional application 62/629,711, filed on Feb. 13, 2018, and international application PCT/CN2018/102178, filed on Aug. 24, 2018, the entire contents of which are herein incorporated by reference.

BACKGROUND

Field of Invention

The present invention relates to a shoe sole. More particularly, a composition of a midsole material of the shoe sole, a method for producing a midsole and a shoe sole are provided.

Description of Related Art

As the improvement of properties of polymer materials and blending technologies, production and materials of a shoe sole are improved daily. Generally, the shoe sole is consisted of a midsole and an outsole. The outsole contacts the ground directly, requiring a frictional force to allow the human body to move easily, so the outsole needs to have excellent wear resistance. Further, the midsole serves as a support of the shoe to absorb and buffer the counter force during movement, thereby protecting the human body. Therefore, the midsole and the outsole have totally different properties and functions.

For those reasons, the midsole and the outsole must be adhered by glue rather than integrated. However, there is excess glue used when applying on the midsole to the outsole, the adhered shoe sole is not good enough for its appearance because of residues often left on the adhered shoe sole. Alternatively, there is insufficient glue used when applying on the midsole to the outsole, an adhesion between the midsole and the outsole is so worse that the midsole and the outsole are easily separated, even resulting in bad experiences of users. Moreover, operating properties of the glue is reduced since it is adhesive and easily adhered on other apparatus and materials.

Besides, environmental consciousness increases, the reusability of an object is recognized as a very important property. However, the conventional shoe soles are not made from recyclable materials mostly, they cannot be recycled or reusable, and they are unlikely processed by other treating methods. Therefore, the conventional shoe soles do not have excellent reusability, even increasing the burden of the environment.

In view of this, there is an urgent need to provide a midsole material composition, a method for producing a midsole material and a shoe sole to produce a recyclable midsole for improving the disadvantages of the conventional shoe soles.

SUMMARY

Therefore, an aspect of the present invention is to provide the midsole material composition. The midsole material composition comprises specific compositions, such that the midsole material composition can produce a recyclable midsole material with excellent foaming properties.

Another aspect of the present invention is to provide the method for producing the midsole material. The method is performed by subjecting an elastomer of the aforementioned midsole material composition to a crosslinking reaction, so as to induce a phase-inversion between the elastomer and a thermoplastic polymer, further producing the midsole material of the present invention by a foaming process.

Another aspect of the present invention is to provide the shoe sole. The shoe sole comprises a midsole produced by the aforementioned method.

According to the aforementioned aspect of the present invention, the midsole material composition is provided. The midsole material composition comprises a blending mixture, a crosslinker and a catalyst. The blending mixture comprises an elastomer and a thermoplastic polymer. The elastomer includes ethylene vinyl acetate, and the thermoplastic polymer includes alkene polymer. The crosslinker comprises a silicone compound and/or a siloxane compound.

According to an embodiment of the present invention, a content of vinyl acetate groups of the aforementioned elastomer is 18 wt % to 40 wt %.

According to another embodiment of the present invention, a molar ratio of the crosslinker to the vinyl acetate groups is 1:1 to 1:8.

According to yet another embodiment of the present invention, the aforementioned ethylene vinyl acetate further comprises ethylene vinyl acetate powder.

According to yet another embodiment of the present invention, based on an amount of the ethylene vinyl acetate as 100 parts by weight, a content of the ethylene vinyl acetate powder is 20 parts by weight to 40 parts by weight.

According to yet another embodiment of the present invention, the aforementioned thermoplastic polymer comprises high density polyethylene, low density polyethylene, polypropylene and/or polystyrene.

According to yet another embodiment of the present invention, a melting index of the aforementioned thermoplastic polymer is 0.3 to 15.

According to yet another embodiment of the present invention, based on an amount of the blending mixture as 100 parts by weight, an amount of the elastomer is 50 parts by weight to 80 parts by weight, and an amount of the thermoplastic polymer is 20 parts by weight to 50 parts by weight.

According to yet another embodiment of the present invention, based on the amount of the blending mixture as 100 parts by weight, an amount of the crosslinker is 4 parts by weight to 10 parts by weight, and an amount of the catalyst is 0.1 parts by weight to 0.7 parts by weight.

According to the further aspect of the present invention, the method for producing the midsole material is provided. A mixture is firstly provided and subjected to a melting process, so as to form a blending mixture. The mixture comprises an elastomer and a thermoplastic polymer. The elastomer includes ethylene vinyl acetate, and the thermoplastic polymer includes alkene polymer. An amount of the elastomer is larger than or equal to an amount of the thermoplastic polymer. In the blending mixture, the elastomer is a continuous phase, and the thermoplastic polymer is a discontinuous phase dispersed in the continuous phase.

Then, a crosslinker and a catalyst are added into the blending mixture and subjected to a crosslinking reaction, so as to form a thermoplastic elastomer. In the thermoplastic elastomer, the thermoplastic polymer is a continuous phase, and the elastomer is a discontinuous phase dispersed in the continuous phase. The crosslinker includes a silicone compound and/or a siloxane compound. Then, the thermoplastic elastomer is subjected to a foaming process to form the midsole material.

According to one embodiment of the present invention, a content of vinyl acetate groups of the elastomer is 18 wt % to 40 wt %.

According to another embodiment of the present invention, a molar ratio of the crosslinker to the vinyl acetate groups is 1:1 to 1:8.

According to yet another embodiment of the present invention, before the crosslinking reaction, the method optionally includes blending the crosslinker and ethylene vinyl acetate powder.

According to yet another embodiment of the present invention, based on an amount of the ethylene vinyl acetate and the ethylene vinyl acetate powder as 100 parts by weight, a content of the ethylene vinyl acetate powder is 20 parts by weight to 40 parts by weight.

According to yet another embodiment of the present invention, a temperature of the foaming process is 50° C. to 120° C.

According to yet another embodiment of the present invention, based on an amount of the mixture as 100 parts by weight, an amount of the elastomer is 50 parts by weight to 80 parts by weight, and an amount of the thermoplastic polymer as 20 parts by weight to 50 parts by weight.

According to yet another embodiment of the present invention, based on the amount of the mixture as 100 parts by weight, an amount of the crosslinker is 4 parts by weight to 10 parts by weight, and an amount of the catalyst is 0.1 parts by weight to 0.7 parts by weight.

According to the further aspect of the present invention, the shoe sole is provided. The shoe sole comprises a midsole produced by the aforementioned method.

In the midsole material composition, the method for producing the midsole material and the shoe sole of the present invention, the midsole material is made from recyclable materials, thereby enhancing recyclable properties of the shoe sole, further increasing reusability thereof. By the phase-inversion of the crosslinking reaction, the midsole material composition of the present invention can be subjected to the foaming process to produce the midsole material.

BRIEF DESCRIPTION OF THE DRAWINGS

The invention can be more fully understood by reading the following detailed description of the embodiment, with reference made to the accompanying drawings as follows.

DETAILED DESCRIPTION

According to the aforementioned features, the effects of the aerogel particle and the method of producing the same can be clearly showed by following embodiments.

Figure 1:
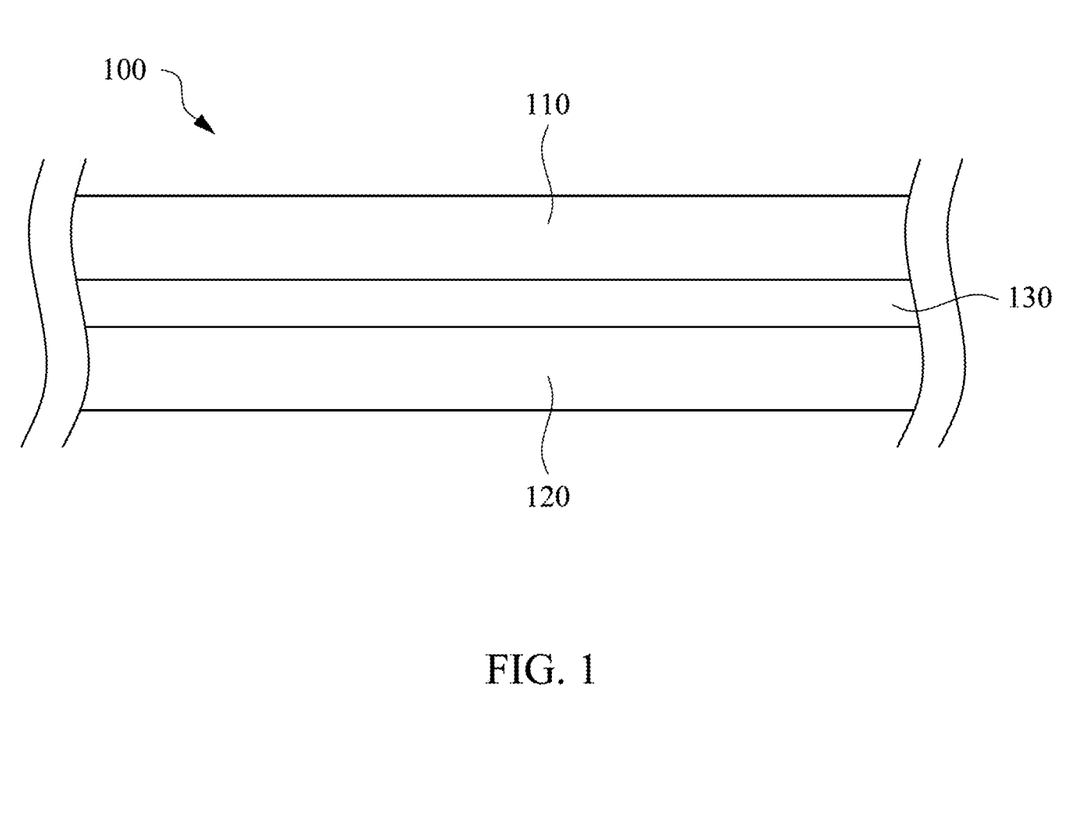
FIG. 1 is a cross-sectional view of a shoe sole according to an embodiment of the present invention.

Referring to FIG. 1, which is a cross-sectional view of a shoe sole according to an embodiment of the present invention. In the shoe sole 100, the shoe sole 100 includes a midsole 110, an outsole 120, and a hot-melt adhesive film 130 which directly adheres the midsole 110 and the outsole 120. The hot-melt adhesive film 130 is located between the midsole 110 and the outsole 120. The midsole 110 is made from a midsole material composition, the outsole 120 is made from an outsole material composition, and the hot-melt adhesive film 130 is made from a hot-melt adhesive film composition. The aforementioned midsole material composition and a method for producing the midsole material are respectively discussed as follows.

Midsole Material Composition

The midsole material composition includes a blending mixture, a crosslinker and a catalyst. The blending mixture includes an elastomer and a thermoplastic polymer. The elastomer can include but not be limited to ethylene vinyl acetate, other suitable elastomer, or a combination thereof. In some embodiments, the elastomer can include a compound having vinyl acetate groups. In some embodiments, a content of the vinyl acetate groups of the elastomer is 18 wt % to 40 wt %, preferably is 26 wt % to 40 wt %, and more preferably is 26 wt % to 33 wt %. When the content of the vinyl acetate groups of the elastomer is in the above ranges, the midsole with better mechanical properties can be made from the midsole material composition. Based on an amount of the blending mixture as 100 parts by weight, an amount of the elastomer can be 50 parts by weight to 80 parts by weight, and more preferably is 50 parts by weight to 60 parts by weight.

In some embodiments, when the elastomer includes the ethylene vinyl acetate, the ethylene vinyl acetate can optionally include ethylene vinyl acetate powder. The ethylene vinyl acetate powder can be formed by spray granulation. Based on an amount of the ethylene vinyl acetate as 100 parts by weight, a content of the ethylene vinyl acetate powder can be 20 parts by weight to 40 parts by weight, preferably is 25 parts by weight to 35 parts by weight, and more preferably is 25 parts by weight to 30 parts by weight.

The aforementioned thermoplastic polymer can include but not be limited to alkene polymer, other suitable thermoplastic polymers, or a combination thereof. In some examples, the alkene polymer can include but not be limited to high density polyethylene, low density polyethylene, polypropylene, polystyrene, other suitable alkene polymers, or a combination thereof. In some embodiments, a melting index of the thermoplastic polymer can be 0.3 to 15, and preferably is 0.5 to 10. Based on the amount of the blending mixture as 100 parts by weight, an amount of the thermoplastic polymer is 20 parts by weight to 50 parts by weight, and preferably is 20 parts by weight to 30 parts by weight.

In some embodiments, based on the amount of the blending mixture as 100 parts by weight, an amount of the elastomer can be larger than 50 parts by weight and smaller than or equal to 80 parts by weight, and an amount of the thermoplastic polymer can be larger than or equal to 20 parts by weight and smaller than 50 parts by weight. When the amounts of the elastomer and the thermoplastic polymer are respectively in the aforementioned ranges, the thermoplastic polymer can be uniformly dispersed in a continuous phase formed from the elastomer before performing a crosslinking reaction, and a phase-inversion reaction between the elastomer and the thermoplastic polymer can be easily induced after performing the crosslinking reaction, thereby inverting the thermoplastic polymer into a continuous phase and inverting the elastomer into a discontinuous phase uniformly dispersed in the continuous phase, further being beneficial to produce the midsole material of the present invention. Because the thermoplastic polymer is a recyclable material and can be inverted into the continuous phase of the midsole material after the crosslinking reaction, recycling properties of the midsole material can be enhanced. Therefore, the midsole material is fully recyclable.

The crosslinker of the midsole material composition can include but be not limited to a silicone compound and/or a siloxane compound. For example, the silicone compound includes tetramethoxysilane (TMOS), tetraethoxysilane (TEOS), tetrapropoxysilane (TPOS), tetrabutoxysilane (TBOS), other suitable silicone compounds, or a combination thereof. The siloxane compound can be a siloxane compound having a long carbon chain. In some embodiments, a number of carbon atoms of the siloxane compound having the long carbon chain can be 5 to 8. For example, the siloxane compound having the long carbon chain can be octadecyl trimethoxy silane, other suitable siloxane compounds, or a combination thereof. Based on the amount of the blending mixture as 100 parts by weight, an amount of the crosslinker is 4 parts by weight to 10 parts by weight, and preferably is 6 parts by weight to 9 parts by weight.

In some embodiments, a molar ratio of the crosslinker to vinyl acetate groups of the elastomer is 1:1 to 1:8, and preferably 1:4 to 1:6. When the molar ratio of the crosslinker to the vinyl acetate groups is in the above range, the elastomer is more efficiently subjected to the crosslinking reaction, thereby increasing viscosity fraction, further inducing phase-inversion reaction.

In some embodiments, when the ethylene vinyl acetate of the elastomer includes the ethylene vinyl acetate powder, the crosslinker can be mixed with the ethylene vinyl acetate powder, such that the crosslinker is absorbed by the ethylene vinyl acetate powder, further contributing to performing the crosslinking reaction.

The catalyst of the midsole material composition includes but is not limited to an esterified catalyst, other suitable catalysts, or a combination thereof. For example, the catalyst can include dibutyltin oxide (DBTO), dioctyitin oxide (DOTO), dibutyltin maleate (DBTM), stannous chloride ($SnCl_2$), other suitable esterified catalysts, or a combination thereof. In some embodiments, based on the amount of the blending mixture as 100 parts by weight, an amount of the catalyst can be 0.1 parts by weight to 0.7 parts by weight, and preferably is 0.2 parts by weight to 0.5 parts by weight. When the amount of the catalyst is in the aforementioned range, the crosslinking reaction can be performed more efficiently.

Method for Producing Midsole Material

Figure 2:
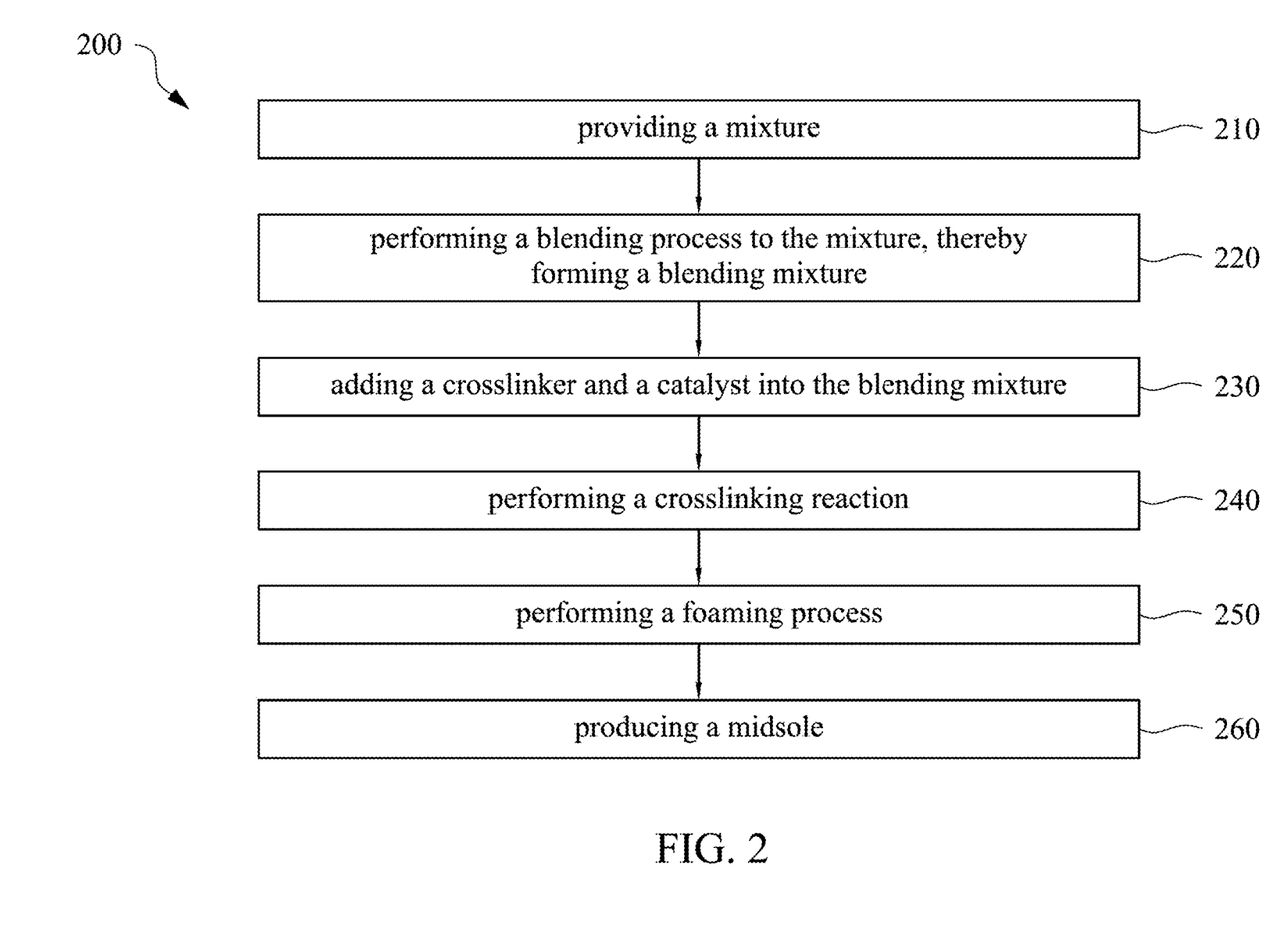
FIG. 2 is a flow chart of a method for producing a midsole according to an embodiment of the present invention.

When the midsole of the present invention is produced, the aforementioned midsole material composition is further subjected to a foaming process, thereby forming the midsole of the shoe sole. The method for producing the midsole of the present invention is discussed as follows. Referring to FIG. 2, which is a flow chart of a method for producing a midsole according to an embodiment of the present invention. In method 200, a mixture is firstly provided and subjected to a melting process to form a blending mixture, shown as operation 210 and operation 220.

The mixture includes an elastomer and a thermoplastic polymer. The elastomer can include but be not limited to ethylene vinyl acetate, other suitable elastomers, or a combination thereof. In some embodiments, the elastomer can include a compound having vinyl acetate groups. A content of the vinyl acetate groups of the elastomer is 18 wt % to 40 wt %, preferably is 26 wt % to 40 wt %, and more preferably is 26 wt % to 33 wt %. The thermoplastic polymer includes alkene polymer, other suitable thermoplastic polymers, or a combination thereof. For example, the alkene polymer includes but is not limited to high density polyethylene, low density polyethylene, polypropylene, polystyrene, other suitable alkene polymers, or a combination thereof. In some embodiments, a melting index of the thermoplastic polymer is 0.3 to 15, and preferably is 0.5 to 10. In the blending mixture formed by performing the melting process, the elastomer is a continuous phase, and the thermoplastic polymer is a discontinuous phase uniformly dispersed in the continuous phase. In some embodiments, an amount of the elastomer of the mixture is larger than or equal to an amount of the thermoplastic polymer. In these embodiments, based on an amount of the mixture as 100 parts by weight, an amount of the elastomer can be 50 parts by weight to 80 parts by weight, and an amount of the thermoplastic polymer is 20 parts by weight to 50 parts by weight.

Preferably, the amount of the elastomer of the mixture is large than the amount of the thermoplastic polymer, thereby promoting the elastomer of the blending mixture to more easily form the continuous phase and promoting the thermoplastic polymer to form the discontinuous phase. In these embodiments, based on the amount of the mixture as 100 parts by weight, the amount of the elastomer is larger than 50 parts by weight and smaller than or equal to 80 parts by weight, and the amount of the thermoplastic polymer is larger than or equal to 20 parts by weight and smaller than 50 parts by weight.

After performing operation 220, a crosslinker and a catalyst are added into the blending mixture, thereby subjecting to a crosslinking reaction to form a thermoplastic elastomer, shown as operation 230 and operation 240. The crosslinker can include but be not limited to a silicone compound and/or a siloxane compound, and the catalyst can include but be not limited to an esterified catalyst.

In some examples, the silicone compound can include tetramethoxysilane, tetraethoxysilane, tetrapropoxysilane, tetrabutoxysilane, other suitable silicone compounds, or a combination thereof; the siloxane compound can be a siloxane compound having a long carbon chain with 5 to 18 carbons (such as octadecyl trimethoxy silane and the like); the catalyst can include but be not limited to dibutyltin oxide, dioctyitin oxide, dibutyltin maleate, stannous chloride, other suitable esterified catalysts, or a combination thereof.

Based on the amount of the blending mixture as 100 parts by weight, an amount of the crosslinker is 4 parts by weight to 10 parts by weight, and an amount of the catalyst is 0.1 parts by weight to 0.7 parts by weight. In some embodiments, for enhancing reaction efficiency of the crosslinking reaction, a molar ratio of the crosslinker to vinyl acetate groups of the elastomer is 1:1 to 1:8, and preferably is 1:4 to 1:6.

During the crosslinking reaction, a viscosity fraction of the elastomer is increased as the increasing of degree of the crosslinking, thereby subjecting the blending mixture to a phase-inversion reaction, further inducing the thermoplastic polymer to phase-invert into a continuous phase and inducing the elastomer to form a discontinuous phase uniformly dispersed in the continuous phase. Therefore, the thermoplastic elastomer formed by the crosslinking reaction can be also known as thermoplastic vulcanizate (TPV) due to the dynamic phase-inversion reaction between the elastomer and the thermoplastic polymer.

In some embodiments, before performing the crosslinking reaction, the aforementioned crosslinker can optionally be mixed with ethylene vinyl acetate powder, such that the crosslinker is absorbed by the ethylene vinyl acetate powder. Based on the difference of the morphology, the ethylene vinyl acetate powder is different from the ethylene vinyl acetate of the elastomer (for clearly describing, hereinafter the ethylene vinyl acetate of the elastomer is abbreviated as ethylene vinyl acetate particle with a larger particle size than ethylene vinyl acetate powder). When the crosslinker is absorbed by the ethylene vinyl acetate powder, the crosslinker can be efficiently blended into the blending mixture by the ethylene vinyl acetate powder, further enhancing reaction efficiency of the crosslinking reaction. Based on a total amount of the ethylene vinyl acetate particle and the ethylene vinyl acetate powder as 100 parts by weight, a content of the ethylene vinyl acetate powder is 20 parts by weight to 40 parts by weight, preferably is 25 parts by weight to 35 parts by weight, and more preferably is 25 parts by weight to 30 parts by weight. After the crosslinker is absorbed by the ethylene vinyl acetate powder, the ethylene vinyl acetate powder with the crosslinker and the catalyst are added into the blending mixture, thereby subjecting to the crosslinking reaction to form the thermoplastic elastomer.

In other embodiments, before performing the melting process, firstly, the crosslinker can mixed with the ethylene vinyl acetate powder. Next, the ethylene vinyl acetate powder with the crosslinker, the ethylene vinyl acetate particle, the thermoplastic polymer and the catalyst are blended to be simultaneously subjected to the melting process and the crosslinking reaction, further producing the thermoplastic elastomer.

Because the ethylene vinyl acetate powder has vinyl acetate groups, it should be realized that the vinyl acetate groups of the ethylene vinyl acetate powder are also taken part in the crosslinking reaction. Therefore, when the crosslinker and the ethylene vinyl acetate powder are blended, based on the amount of the mixture as 100 parts by weight, a total amount of the ethylene vinyl acetate particle and the ethylene vinyl acetate powder can be 50 parts by weight to 80 parts by weight. Similarly, when a ratio of a mole number of the crosslinker to a total mole number of the vinyl acetate groups of the ethylene vinyl acetate particle and the ethylene vinyl acetate powder is 1:1 to 1:8, reaction efficiency of the crosslinking reaction can be enhanced. Preferably, the aforementioned molar ratio can be 1:4 to 1:6.

After performing the operation 240, the thermoplastic elastomer is subjected to a foaming process to form a midsole, shown as operation 250 and operation 260.

During the foaming process, because the vinyl acetate groups have higher solubility to carbon dioxide, the discontinuous phase (i.e. the elastomer) of the thermoplastic elastomer can induce the carbon dioxide to penetrate into the thermoplastic elastomer, thereby increasing numbers of bubbles in the thermoplastic elastomer. Therefore, when the bubbles of the carbon dioxide are started to be swelled and nucleation, uniformly dispersed pores are formed in an interior of the thermoplastic elastomer, rather than merely foaming in a surface of the thermoplastic elastomer, therefore efficiently increasing foam expansion value of the thermoplastic elastomer. Moreover, the elastomer (i.e. the original continuous phase) can be phase-inverted into a discontinuous phase during the crosslinking reaction, and the elastomer easily produces phase-separation particles dispersed in the continuous phase during the dynamic phase-inversion reaction. Accordingly, after the bubbles of the carbon dioxide are started to be swelled and nucleation, those phase-separation particles are uniformly dispersed in an interior of the pores, thereby equipping efficacy of reinforcing structures, further enhancing mechanical properties of the midsole.

In some embodiments, a temperature of the foaming process is 50° C. to 120° C., and preferably is 60° C. to 70° C. When the temperature of the foaming process is in the aforementioned range, the bubbles of the carbon dioxide can be swelled in the thermoplastic elastomer to be nucleation, thereby decreasing a foaming density of the midsole. In some examples, the foaming density of the midsole can be smaller than or equal to 0.4 $g/cm^3$, preferably is smaller than or equal to 0.25 $g/cm^3$, and more preferably is 0.1 $g/cm^3$ to 0.2 $g/cm^3$.

In the midsole of the present invention, by the crosslinking reaction, the aforementioned thermoplastic polymer can be dynamically inverted into the continuous phase. The thermoplastic polymer is equipped with recycling property. Accordingly, the thermoplastic polymer inverted into the continuous phase contributes to enhance recycling properties of the midsole. Therefore, the midsole is a fully-recyclable material.

Several embodiments are described below to illustrate the application of the present invention. However, these embodiments are not used for limiting the present invention. For those skilled in the art of the present invention, various variations and modifications can be made without departing from the spirit and scope of the present invention.

Producing Midsole Material

Example 1-1

Firstly, high density polyethylene (HDPE) and ethylene vinyl acetate (EVA) were blended in a weight ratio 3:7 to form a blending mixture. The ethylene vinyl acetate contains 26 wt % of vinyl acetate groups. Then, dibutyltin oxide and tetraethoxysilane (TEOS) were added into the blending mixture to subject to a crosslinking reaction, thereby producing a thermoplastic elastomer of Example 1-1. A molar ratio of the tetraethoxysilane to the vinyl acetate groups of the ethylene vinyl acetate was 1:4.

Next, carbon dioxide in supercritical fluid state was applied into the aforementioned thermoplastic elastomer, so as to perform a foaming process, thereby producing the midsole material of Example 1-1. Foaming temperature was 68° C., foaming pressure was 2000 psi, and foaming time was 20 minutes.

Figure 3A:
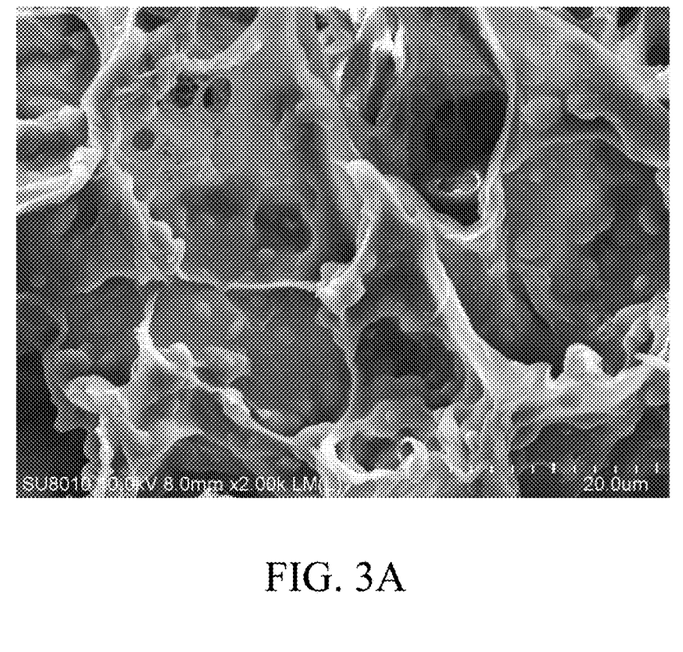
FIGS. 3A to 3H respectively show SEM images of midsole materials of Examples 1-1, 1-2, 1-4, 1-5, 1-8, 1-9, 1-11 and 1-12.

And then, the midsole material of the Example 1-1 was observed by scanning electron microscope (SEM), and the result was shown as FIG. 3A. Scale bar represented 20 μm. A foaming density of the midsole material of Example 1-1 was 0.206 $g/cm^3$.

Example 1-2 to Example 1-12

Figure 3B:
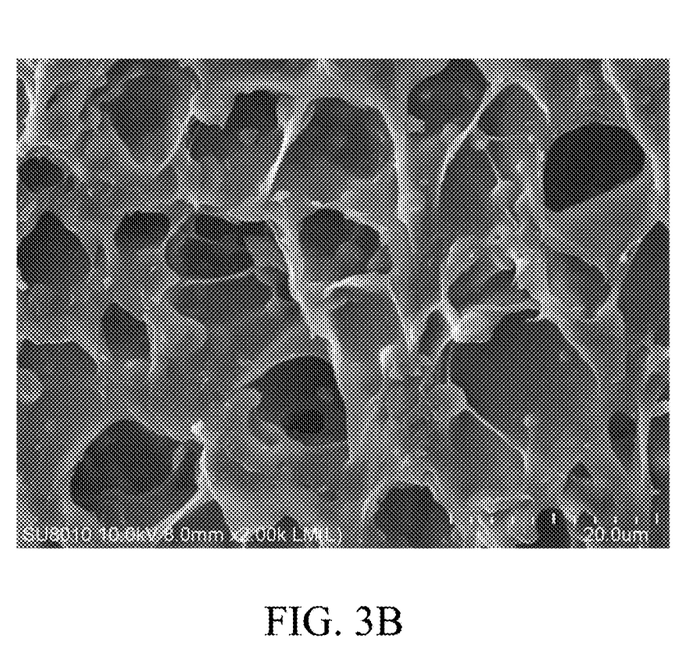
Figure 3C:
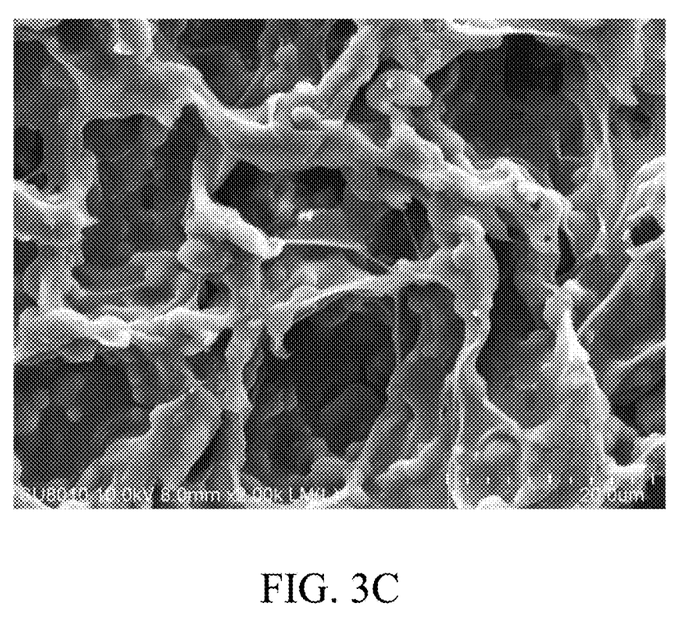
Figure 3D:
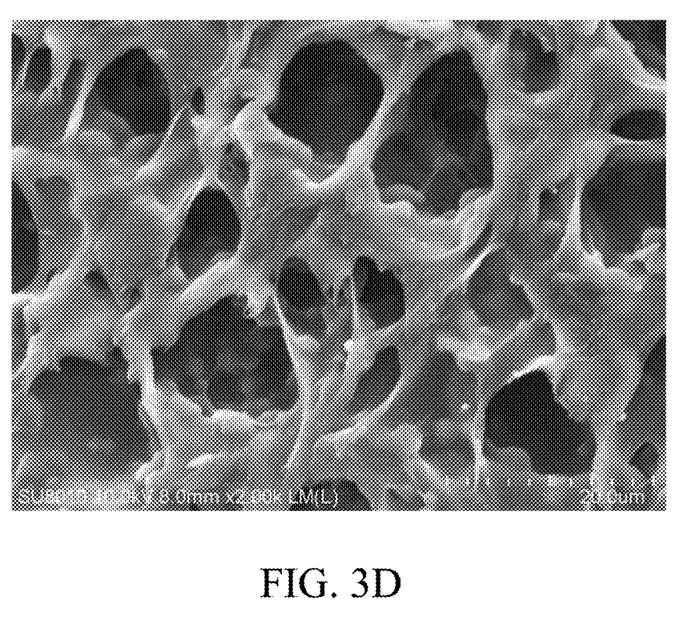
Figure 3E:
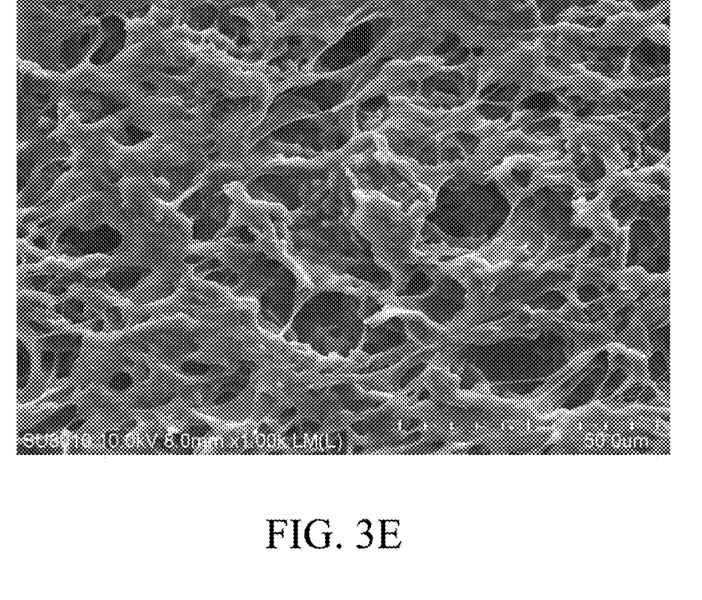
Figure 3F:
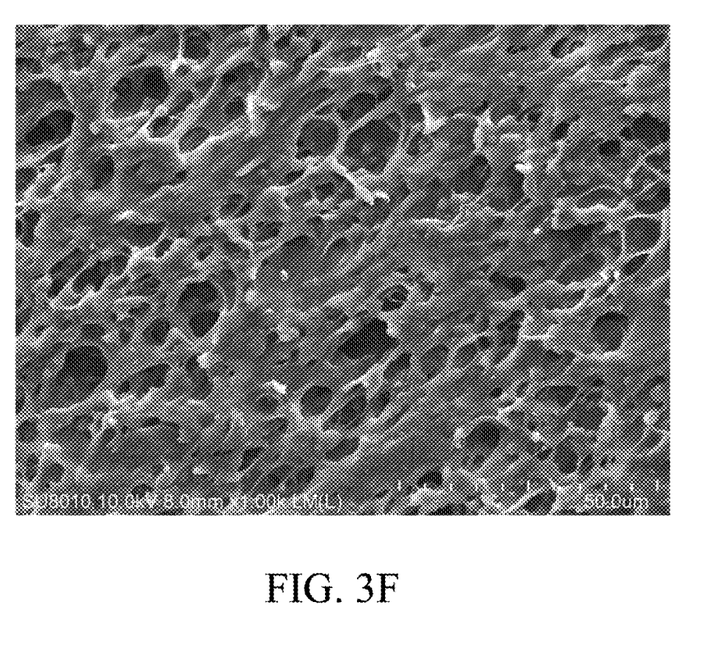
Figure 3G:
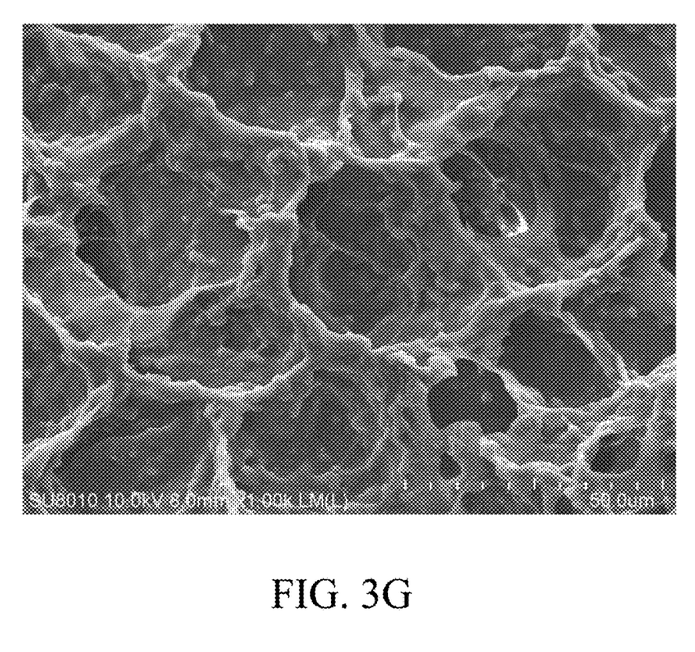
Figure 3H:
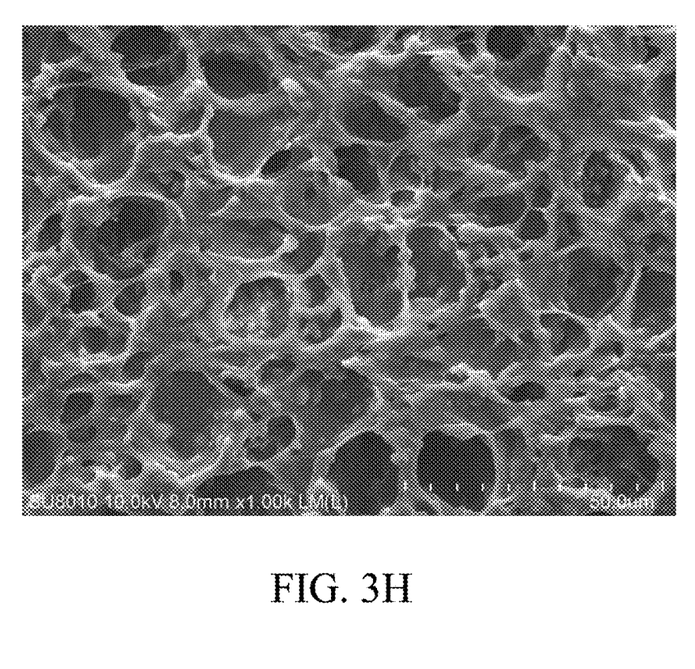

Example 1-2 to Example 1-12 were practiced with the same method as in Example 1 by using different blending parameters and foaming parameters. The parameters thereof and foaming densities of the midsole materials of Example 1-2 to Example 1-12 were listed in Table 1. Further, the midsole materials of Examples 1-2, 1-4, 1-5, 1-8, 1-9, 1-11 and 1-12 respectively were observed by SEM, and the result were respectively shown as FIGS. 3B to 3H. Scale bars in FIGS. 3B to 3D all were 20 μm, and scale bars in FIGS. 3E to 3H all were 50 μm.

TABLE 1

|  |  | Example 1-1 | Example 1-2 | Example 1-3 | Example 1-4 | Example 1-5 | Example 1-6 |
|---|---|---|---|---|---|---|---|
| blending process | weight ratio of HDPE and EVA | 3:7 | 3:7 | 3:7 | 3:7 | 3:7 | 3:7 |
|  | content of vinyl acetate groups of EVA (wt %) | 26% | 26% | 26% | 26% | 26% | 26% |
| crosslinking reaction | molar ratio of TEOS and vinyl acetate groups | 1:4 | 1:4 | 1:4 | 1:6 | 1:6 | 1:6 |
| foaming process | temperature (° C.) | 68 | 58 | 49 | 68 | 58 | 49 |
|  | pressure (psi) | 2000 | 2000 | 2000 | 2000 | 2000 | 2000 |
|  | time (min) | 20 | 20 | 20 | 20 | 20 | 20 |
|  | foaming density (g/cm$^3$) | 0.206 | 0.126 | 0.306 | 0.161 | 0.113 | 0.289 |

|  |  | Example 1-7 | Example 1-8 | Example 1-9 | Example 1-10 | Example 1-11 | Example 1-12 |
|---|---|---|---|---|---|---|---|
| blending process | weight ratio of HDPE and EVA | 5:5 | 5:5 | 5:5 | 3:7 | 3:7 | 3:7 |
|  | content of vinyl acetate groups of EVA (wt %) | 40% | 40% | 40% | 40% | 40% | 40% |
| crosslinking reaction | molar ratio of TEOS and vinyl acetate groups | 1:6 | 1:6 | 1:6 | 1:6 | 1:6 | 1:6 |
| foaming process | temperature (° C.) | 112 | 68 | 49 | 90 | 68 | 49 |
|  | pressure (psi) | 2000 | 2000 | 2000 | 2000 | 2000 | 2000 |
|  | time (min) | 20 | 20 | 20 | 20 | 20 | 20 |
|  | foaming density (g/cm$^3$) | 0.312 | 0.379 | 0.401 | 0.352 | 0.195 | 0.200 |

Based on Example 1-1 to Example 1-6 recited in Table 1, as the amounts of the tetraethoxysilane (i.e. the crosslinker) increasing, the midsole material had higher foaming density. Moreover, based on Example 1-7 to Example 1-12, because the amount of the high density polyethylene was increased, the high density polyethylene was tended to be crystalline, so as to block the carbon dioxide from penetrating into the thermoplastic elastomer, further lowering the foaming efficacy. Therefore, the midsole materials of Example 1-7 to Example 1-12 had higher foaming density. However, the midsole materials of Example 1-1 to Example 1-12 were all smaller than or equal to 0.4 g/cm$^3$. Therefore, the midsole material composition of the present invention can produce the midsole material with excellent foaming properties by the foaming process.

Besides, according to FIGS. 3A to 3D, surfaces of the pores all had protruding particles uniformly dispersed thereon. Further, analyzing atoms of those particles and atoms of sheet structure (i.e. flat surface in the pores) by energy dispersive spectrometer (EDS). Based on the analyzing result, a content of oxygen atoms in those particles were higher than that in the sheet structure of the pores. Accordingly, those particles were phase-separation particles formed by ethylene vinyl acetate during the dynamic crosslinking (i.e. dynamic phase-inversion reaction).

Furthermore, according to FIGS. 3E to 3H, as the contents of the ethylene vinyl acetate decreasing, pores of the midsole material were unapparent and dispersed non-uniformly. Thus, the ethylene vinyl acetate of the blending mixture contributed the carbon dioxide to penetrate into the thermoplastic elastomer, thereby enhancing the foaming efficacy of the foaming process.

As the above, the phase-separation particles formed by the ethylene vinyl acetate during the dynamic crosslinking can be uniformly dispersed in pores of the midsole material, such that the phase-separation particles can reinforce mechanical properties of the midsole material. During the foaming process, the ethylene vinyl acetate contributed the carbon dioxide to penetrate into the thermoplastic elastomer, thereby enhancing foaming efficacy.

Based on the aforementioned description, the midsole material composition of the present invention is made from recyclable materials. Therefore, the midsole material is fully-recyclable, thereby lowering impacts of the environments. Moreover, the midsole material can be efficiently produced by subjecting the midsole material composition of the present invention to the foaming process. By adjusting the content of the ethylene vinyl acetate of the midsole material composition, the carbon dioxide can easily penetrate into the thermoplastic elastomer, such that the thermoplastic elastomer is efficiently foamed, further improving the midsole material.

Thus, the midsole of the present invention is fully-recyclable, thereby increasing reusability of resources. The midsole of the present invention can be produced by the foaming process, therefore enhancing convenience for producing the same.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A midsole material composition, comprising:
a blending mixture, comprising:
an elastomer, including ethylene vinyl acetate, wherein the content of vinyl acetate groups of the elastomer is 18 wt % to 40 wt %, wherein the elastomer is a continuous phase in the blending mixture; and
a thermoplastic polymer, including alkene polymer, wherein the alkene polymer includes high density polyethylene, low density polyethylene, polypropylene and/or polystyrene, wherein the thermoplastic polymer is a discontinuous phase dispersed in the continuous phase;
wherein based on the amount of the blending mixture as 100 parts by weight, the amount of the elastomer is larger than 50 parts by weight and less than or equal to 80 parts by weight, and the amount of the thermoplastic polymer is larger than or equal to 20 parts by weight and less than 50 parts by weight;
a crosslinker, including a silicone compound and/or a siloxane compound, wherein the silicone compound is selected from a group consisting of tetramethoxysilane, tetraethoxysilane, tetrapropoxysilane and tetrabutoxysilane, and the crosslinker is configured to subject a phase-inversion crosslinking reaction to the elastomer; and
a catalyst, configured to catalyze the phase-inversion crosslinking reaction.

2. The midsole material composition of claim 1, wherein a molar ratio of the crosslinker to the vinyl acetate groups is 1:1 to 1:8.

3. The midsole material composition of claim 1, wherein the ethylene vinyl acetate further includes ethylene vinyl acetate powder.

4. The midsole material composition of claim 3, wherein based on the amount of the ethylene vinyl acetate as 100 parts by weight, the content of the ethylene vinyl acetate powder is 20 parts by weight to 40 parts by weight.

5. The midsole material composition of claim 1, wherein a melting index of the thermoplastic polymer is 0.3 to 15.

6. The midsole material composition of claim 1, wherein based on the amount of the blending mixture as 100 parts by weight, the amount of the crosslinker is 4 parts by weight to 10 parts by weight, and the amount of the catalyst is 0.1 parts by weight to 0.7 parts by weight.

7. A method for producing a midsole material, comprising:
providing a mixture, wherein the mixture includes:
an elastomer, including ethylene vinyl acetate, wherein the content of vinyl acetate groups of the elastomer is 18 wt % to 40 wt %; and
a thermoplastic polymer, including alkene polymer, wherein the alkene polymer includes high density polyethylene, low density polyethylene, polypropylene and/or polystyrene; and
wherein based on the amount of the mixture as 100 parts by weight, the amount of the elastomer is larger than 50 parts by weight and less than or equal to parts by weight, and the amount of the thermoplastic polymer is larger than or equal to 20 parts by weight and less than 50 parts by weight;
performing a melting process to the mixture, thereby forming a blending mixture, wherein the elastomer is a continuous phase, and the thermoplastic polymer is a discontinuous phase dispersed in the continuous phase;
adding a crosslinker and a catalyst into the blending mixture, and subjecting a phase-inversion crosslinking reaction to the elastomer, thereby forming a thermoplastic elastomer, wherein the thermoplastic polymer in the thermoplastic elastomer is inverted to a continuous phase during the phase-inversion crosslinking reaction, and the elastomer in the thermoplastic elastomer is inverted to a discontinuous phase dispersed in the continuous phase, wherein the crosslinker includes a silicone compound and/or a siloxane compound, and the silicone compound is selected from a group consisting of tetramethoxysilane, tetraethoxysilane, tetrapropoxysilane and tetrabutoxysilane; and
performing a foaming process to the thermoplastic elastomer, thereby forming the midsole material.

8. The method for producing the midsole material of claim 7, wherein a molar ratio of the crosslinker to the vinyl acetate groups is 1:1 to 1:8.

9. The method for producing the midsole material of claim 7, before performing the crosslinking reaction, the method further comprises:
blending the crosslinker and an ethylene vinyl acetate powder.

10. The method for producing the midsole material of claim 9, wherein based on the amount of the ethylene vinyl acetate and the ethylene vinyl acetate powder as 100 parts by weight, the content of the ethylene vinyl acetate powder is 20 parts by weight to 40 parts by weight.

11. The method for producing the midsole material of claim 7, wherein a temperature of the foaming process is 50° C. to 120° C.

12. The method for producing the midsole material of claim 7, wherein based on the amount of the mixture as 100 parts by weight, the amount of the crosslinker is 4 parts by weight to 10 parts by weight, and the amount of the catalyst is 0.1 parts by weight to 0.7 parts by weight.

13. A shoe sole, comprising a midsole, wherein the midsole comprises the midsole material produced by the method of claim 7.

* * * * *